US010866934B1

(12) United States Patent
Chen et al.

(10) Patent No.: US 10,866,934 B1
(45) Date of Patent: Dec. 15, 2020

(54) TOKEN-BASED DATA FLOW CONTROL IN A CLUSTERED STORAGE SYSTEM

(71) Applicant: EMC IP Holding Company LLC, Hopkinton, MA (US)

(72) Inventors: Xiangping Chen, Sherborn, MA (US); David Meiri, Somerville, MA (US); Anton Kucherov, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 497 days.

(21) Appl. No.: 15/662,708

(22) Filed: Jul. 28, 2017

(51) Int. Cl.
| G06F 13/16 | (2006.01) |
| G06F 16/182 | (2019.01) |
| G06F 17/18 | (2006.01) |
| G06F 13/37 | (2006.01) |
| G06F 16/11 | (2019.01) |

(52) U.S. Cl.
CPC .......... *G06F 16/1827* (2019.01); *G06F 13/37* (2013.01); *G06F 16/122* (2019.01); *G06F 16/182* (2019.01); *G06F 17/18* (2013.01)

(58) Field of Classification Search
USPC ........ 370/230–238, 395.4–395.42, 458, 468; 710/29, 45, 117, 124
See application file for complete search history.

(56) References Cited

U.S. PATENT DOCUMENTS

| 2011/0261740 | A1* | 10/2011 | Loc | H04L 5/0037 |
| | | | | 370/311 |
| 2014/0137236 | A1* | 5/2014 | Wang | H04L 67/32 |
| | | | | 726/20 |
| 2016/0261513 | A1* | 9/2016 | Aingaran | H04L 47/30 |
| 2016/0345207 | A1* | 11/2016 | Kwak | H04W 28/14 |
| 2017/0075842 | A1* | 3/2017 | Su | H04L 49/35 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — Ilwoo Park
(74) *Attorney, Agent, or Firm* — Ryan, Mason & Lewis, LLP

(57) ABSTRACT

An apparatus in one embodiment comprises a storage system including multiple storage nodes each having a plurality of storage devices. Each of the storage nodes further comprises a set of processing modules configured to communicate with corresponding sets of processing modules on other ones of the storage nodes. The sets of processing modules of the storage nodes collectively comprise at least a portion of a distributed storage controller of the storage system. The distributed storage controller is configured to implement token-based data flow control between designated ones of the modules by determining a token distribution for the designated modules, the token distribution providing an allocation of tokens to particular ones of the designated modules. A given one of the modules is configured to limit its generation of messages to other modules based at least in part on availability of corresponding ones of the tokens allocated to the given module.

20 Claims, 7 Drawing Sheets

(56) References Cited

OTHER PUBLICATIONS

EMC Corporation, "Unstoppable Data Reduction: Always-on, In-Line, Zero-Penalty, Enterprise-Class, Free," https://store.emc.com/xtremio, Jul. 2014, 2 pages.
EMC Corporation, "Introduction to XtremIO Virtual Copies," White Paper, Mar. 2016, 39 pages.
EMC Corporation, "XtremIO Data Production (XDP): Flash-Specific Data Protection, Provided by XtremIO (Ver. 4.0)," White Paper, Apr. 2015, 25 pages.
Dell EMC, "XtremIO v6.0 Specifications," Specification Sheet, 2017, 4 pages.
Dell EMC, "Dell EMC XtremIO X2: Next-Generation All-Flash Array," Data Sheet, 2017, 5 pages.
Itzikr, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.
EMC Corporation, "High Availability, Data Protection and Data Integrity in the XtremIO Architecture," White Paper, Apr. 2015, 28 pages.

* cited by examiner

US 10,866,934 B1

TOKEN-BASED DATA FLOW CONTROL IN A CLUSTERED STORAGE SYSTEM

FIELD

The field relates generally to information processing systems, and more particularly to storage in information processing systems.

BACKGROUND

Storage systems are often configured in a distributed manner. For example, clustered storage systems are illustratively implemented using multiple distributed storage nodes that are interconnected by one or more networks. A problem that can arise in these and other clustered storage systems is that communications between particular distributed components implemented on different ones of the storage nodes can become excessive under certain conditions, thereby unduly limiting the overall throughput and latency performance of the clustered storage system. This is particularly true in clustered storage systems that include non-atomic persistent storage environments such as may be associated with a content addressable storage system comprising an all-flash storage array.

SUMMARY

Illustrative embodiments provide improved techniques for token-based data flow control in a clustered storage system. For example, in some embodiments, the token-based data flow control is configured to limit numbers of control-to-routing messages generated by control modules of respective storage nodes of the clustered storage system to each of a plurality of routing modules of respective ones of the storage nodes based at least in part on availability of tokens to the control modules. Such embodiments can advantageously provide significantly improved throughput and latency performance in the context of data replication and other types of data transfers that are performed in a clustered implementation of a content addressable storage system having a distributed storage controller. Similar advantages can be provided in other types of storage systems.

In one embodiment, an apparatus comprises a storage system comprising a plurality of storage nodes each having a plurality of storage devices. Each of the storage nodes further comprises a set of processing modules configured to communicate over one or more networks with corresponding sets of processing modules on other ones of the storage nodes. The sets of processing modules of the storage nodes collectively comprise at least a portion of a distributed storage controller of the storage system. The distributed storage controller is configured to implement token-based data flow control between designated ones of the modules by determining a token distribution for the designated modules, the token distribution providing an allocation of tokens to particular ones of the designated modules. A given one of the modules is configured to limit its generation of messages to other ones of the modules based at least in part on availability of corresponding ones of the tokens allocated to the given module.

The distributed control module in some embodiments is further configured to collect statistics characterizing communications between the modules, and to adjust the token distribution dynamically over time based at least in part on the collected statistics.

The set of processing modules of each of the storage nodes may comprise at least a control module, a data module and a routing module.

The designated modules may comprise control modules of respective ones of the storage nodes. In such an arrangement, the token-based data flow control may be configured to limit numbers of control-to-routing messages generated by the control modules to each of a plurality of routing modules of respective ones of the storage nodes based at least in part on availability of tokens to the control modules.

In some embodiments, the storage system illustratively comprises a content addressable storage system, and the storage devices comprise non-volatile memory devices such as flash drives. For example, the storage devices in such embodiments can be configured to collectively provide an all-flash storage array. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
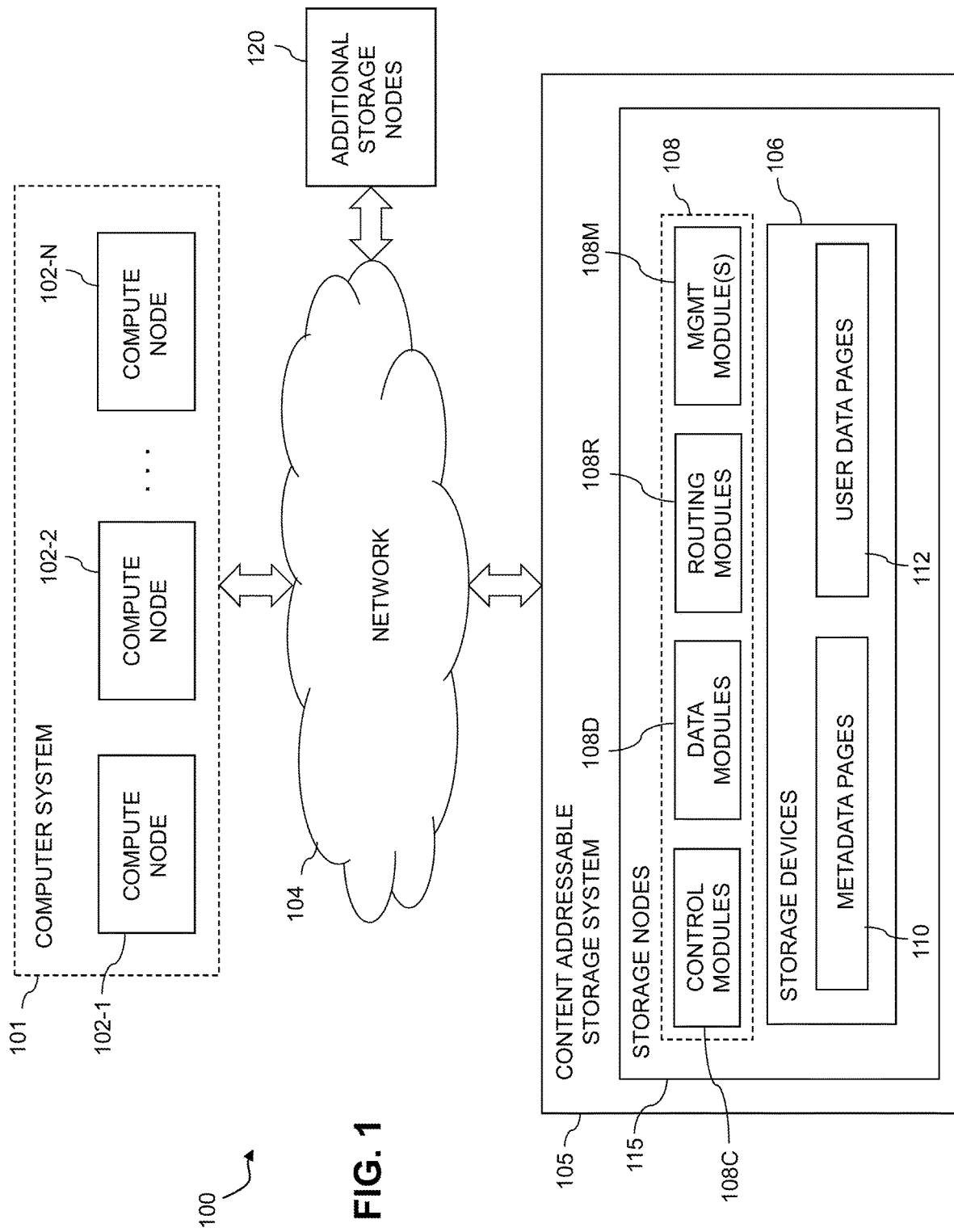
FIG. 1 is a block diagram of an information processing system comprising a content addressable storage system configured for token-based data flow control in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

Figure 2:
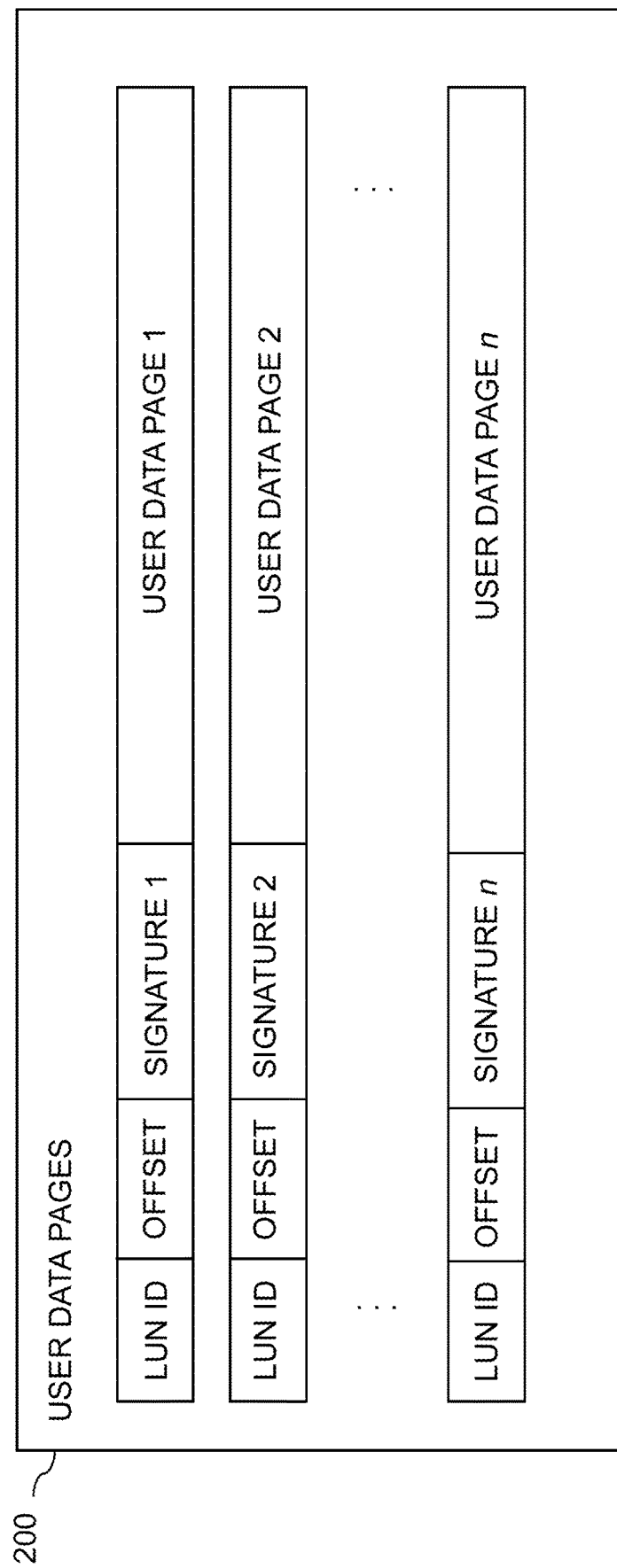
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
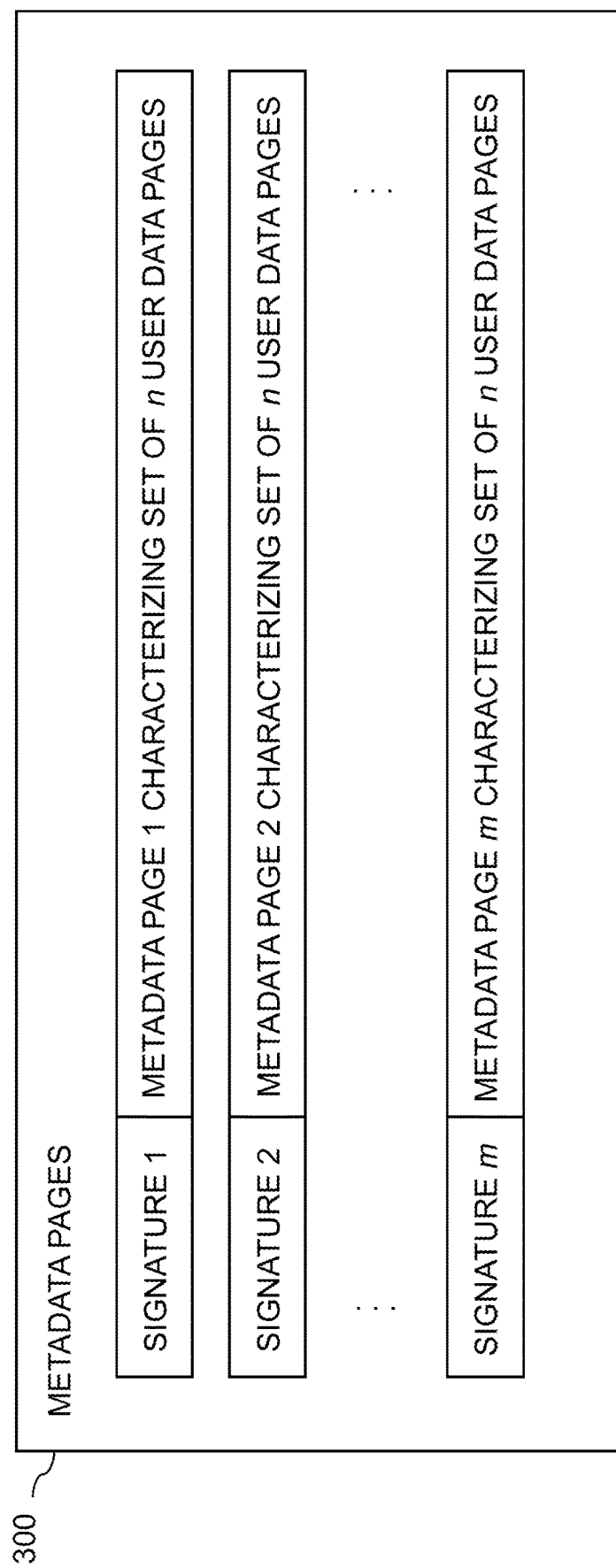
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of a distributed storage controller 108 of the content addressable storage system 105.

The distributed storage controller 108 in the present embodiment is configured to implement token-based data flow control between designated ones of the modules by determining a token distribution for the designated modules, with the token distribution providing an allocation of tokens to particular ones of the designated modules. One or more of the modules are each configured to limit its generation of messages to other ones of the modules based at least in part on availability of corresponding ones of the tokens allocated to the given module.

The distributed storage controller 108 is illustratively configured to collect statistics characterizing communications between the modules and to adjust the token distribution dynamically over time based at least in part on the collected statistics.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

In some embodiments, the content addressable storage system 105 comprises an XtremIO™ storage array suitably modified to incorporate token-based data flow control techniques as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, token-based data flow control in some embodiments is implemented by at least one system-wide management module of the distributed storage controller 108.

In the above-described XtremIO™ storage array example, each user data page typically has a size of 8 KB and its content-based signature is a 20-byte signature generating using an SHA1 hash function. Also, each page has a LUN identifier and an offset, and so is characterized by <lun_id, offset, signature>.

As mentioned previously, storage controller components in an XtremIO™ storage array illustratively include C-module and D-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, and then the metadata page signature is computed and the metadata page is read using the computed signature. In this embodiment, the metadata page signature is more particularly computed using a signature generation algorithm that generates the signature to include a hash of the 8-byte metadata page identifier, one or more ASCII code for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

In the distributed storage controller 108, the designated modules for which token-based flow control is implemented include control modules 108C of respective ones of the storage nodes 115. The token-based data flow control in this case is configured to limit numbers of control-to-routing messages generated by the control modules 108C to each of the routing modules 108R of respective ones of the storage nodes 115 based at least in part on availability of tokens to the control modules 108C.

Figure 4:
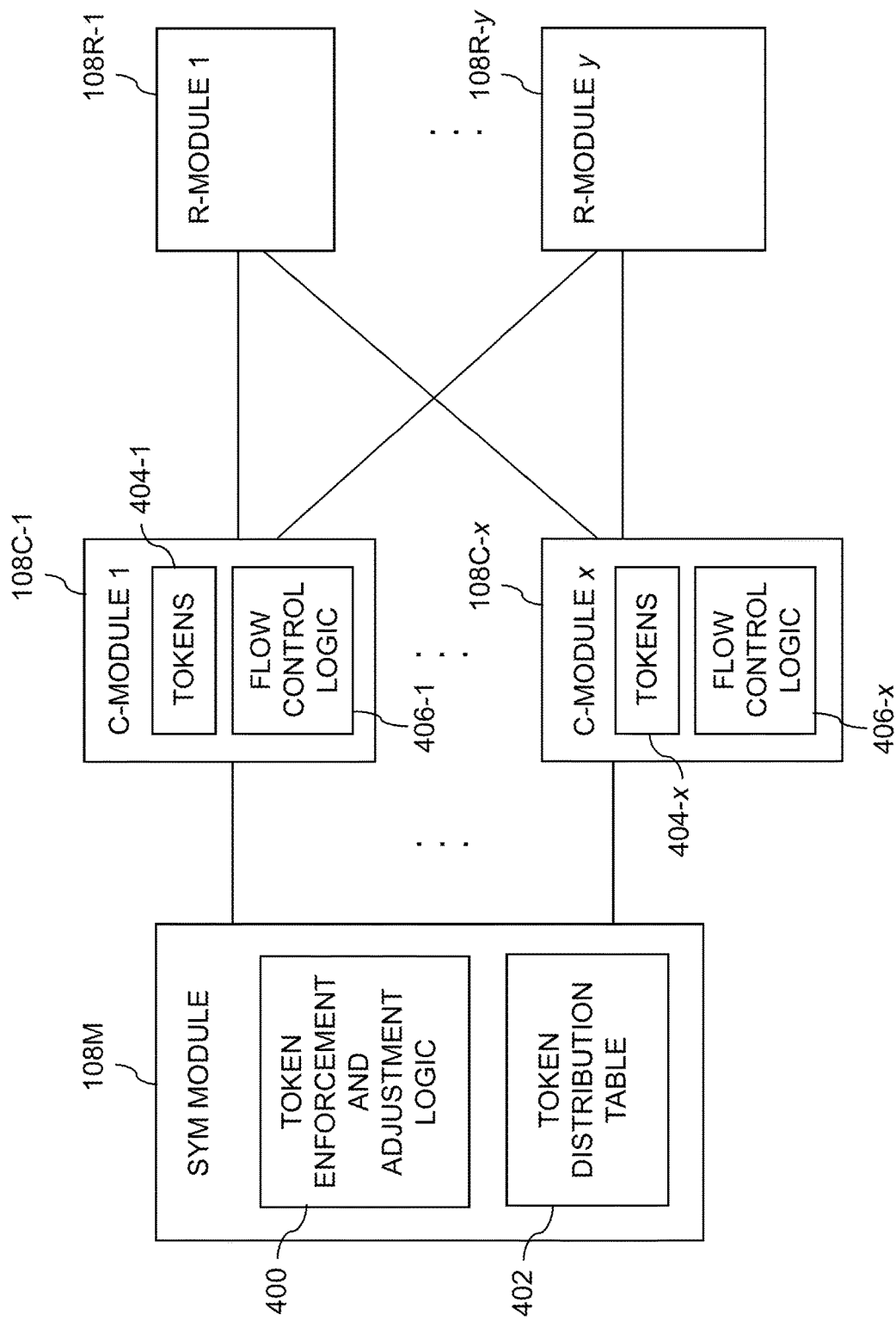
FIG. 4 illustrates a portion of a distributed storage controller of a content addressable storage system showing an example of token-based data flow control for communications between control modules and routing modules of the distributed storage controller.

Referring now to FIG. 4, a more detailed view of a portion of the distributed storage controller 108 in an illustrative embodiment is shown. This embodiment illustrates an example of token-based data flow control for communications between control modules 108C and routing modules 108R of the distributed storage controller 108.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises token enforcement and adjustment logic 400 and a token distribution table 402. The management module 108M communicates with control modules 108C-1 through 108C-x, also denoted as C-module 1 through C-module x. The control modules 108C communicate with routing modules 108R-1 through 108R-y, also denoted as R-module 1 through R-module y. The variables x and y are arbitrary integers greater than one, and may but need not be equal. In some embodiments, each of the storage nodes 115 of the content addressable storage system 105 comprises one of the control modules 108C and one of the routing modules 108R, as well as one or more additional modules including one of the data modules 108D.

The control modules 108C-1 through 108C-x in the FIG. 4 embodiment are configured to store respective sets of one or more tokens 404-1 through 404-x. These sets of tokens 404-1 through 404-x are utilized by corresponding instances of flow control logic 406-1 through 406-x to limit the number of control-to-routing messages generated by the control modules 108C to each of the routing modules 108R.

The token distribution table 402 of the management module 108M may be configured to indicate for each of the control modules 108C a particular number of tokens allocated for use in conjunction with generation of the control-to-routing messages by that control module to each of the routing modules 108R.

For example, the token distribution table 402 may specify a particular number of tokens for each of a plurality of communication links between a given one of the control modules 108C and respective ones of the routing modules 108R. The sets of tokens 404 are allocated to respective ones of the control modules 108C by the token enforcement and adjustment logic 400 of the management module 108M.

The flow control logic 406-$i$ in a given one of the control modules 108C-i is configured such that prior to sending one of the control-to-routing messages to one of the routing modules 108R-j, it first determines if a token is available in the corresponding set of tokens 404-$i$ for its communication link to that routing module. If the token is available for that communication link in the set of tokens 404-$i$, the given control module 108C-i transmits the control-to-routing message to the routing module 108R-j. However, if the token is not available in the set of tokens 404-$i$, the given control module 108C-i does not transmit the control-to-routing message to the routing module 108R-j.

After the given one of the control modules 108C-i transmits the control-to-routing message to the routing module 108R-j, a corresponding one of the allocated tokens 404-$i$ becomes unavailable until a response to the control-to-routing message is received in the control module 108C-i from the routing module 108R-j.

The other flow control logic instances 406 in the other control modules 108C are similarly configured to control the transmission of control-to-routing messages based on their respective corresponding sets of tokens 404.

The token enforcement and adjustment logic 400 in the management module 108M of the distributed storage controller 108 is further configured to determine initial numbers of tokens to be allocated to the respective sets of tokens 404 of the control modules 108C based at least in part on ratios of numbers of data slices associated with respective ones of the control modules to a total number of data slices in the storage devices 106 of the content addressable storage system 105. Additional or alternative criteria can be used to determine initial numbers of tokens for the sets of tokens 404.

The management module 108M in some embodiments transmits information characterizing at least portions of the token distribution table 402 to respective ones of the control modules 108C. For example, the management module 108M may be configured to periodically transmit to each of the control modules 108C its corresponding portion of the token distribution table 402. Alternatively, the entire token distribution table 402 can be periodically transmitted to all of the control modules 108C.

The token enforcement and adjustment logic 400 can therefore make changes in the distribution of the total number of allocated tokens across the sets of tokens 404 of the respective control modules 108C by altering the token distribution table 402. Changes in the total number of allocated tokens itself can additionally or alternatively be made.

As indicated above, the distributed storage controller 108 may be configured to collect statistics characterizing communications between the control modules 108C and the routing modules 108R and to adjust the token distribution reflected in token distribution table 402 dynamically over time based at least in part on the collected statistics.

For example, the collected statistics may include one or more of actual data transfer rate, message processing rate and average message latency for each of a plurality of communication links between respective control-routing pairs each containing one of the control modules 108C and one of the routing modules 108R.

The token enforcement and adjustment logic 400 of the management module 108M is further configured in some embodiments to adjust the token distribution dynamically over time based at least in part on the collected statistics. For example, the token enforcement and adjustment logic 400 can increase a number of allocated tokens for at least one of the control modules 108C responsive to an actual latency being less than a desired latency and decrease a number of allocated tokens for one or more of the control modules 108C responsive to the actual latency being greater than a desired latency.

The token enforcement and adjustment logic 400 can make additional or alternative adjustments under other conditions. For example, the token enforcement and adjustment logic may be further configured to alter the token distribution responsive to a change in a distribution of data slices over the control modules 108C and data modules 108D of the distributed storage controller 108.

It should be understood that the particular arrangement of processing modules 108C, 108R and 108M and their respective components as shown in the FIG. 4 embodiment is presented by way of example only. Numerous alternative arrangements of processing modules of a distributed storage controller may be used to implement token-based data flow control in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for token-based data flow control can be offered to cloud infrastructure customers or other users as a PaaS offering.

The operation of the information processing system 100 will now be described in further detail with reference to the flow diagram of the example embodiment of FIG. 5. The process as shown includes steps 500 through 506, and is suitable for use in the system 100 but is more generally applicable to other types of information processing systems comprising a content addressable storage system or other type of storage system.

In step 500, token-based data flow control is implemented between control modules and routing modules of a distributed storage controller by determining a token distribution for the control modules, the token distribution providing an allocation of tokens to particular ones of the control modules.

In step 502, each of the control modules is configured to limit its generation of messages to respective ones of the routing modules based at least in part on availability of corresponding ones of the tokens allocated to that control module.

In step 504, statistics characterizing communications between the control modules and the routing modules are collected.

In step 506, the token distribution is adjusted dynamically over time based at least in part on the collected statistics.

Figure 5:
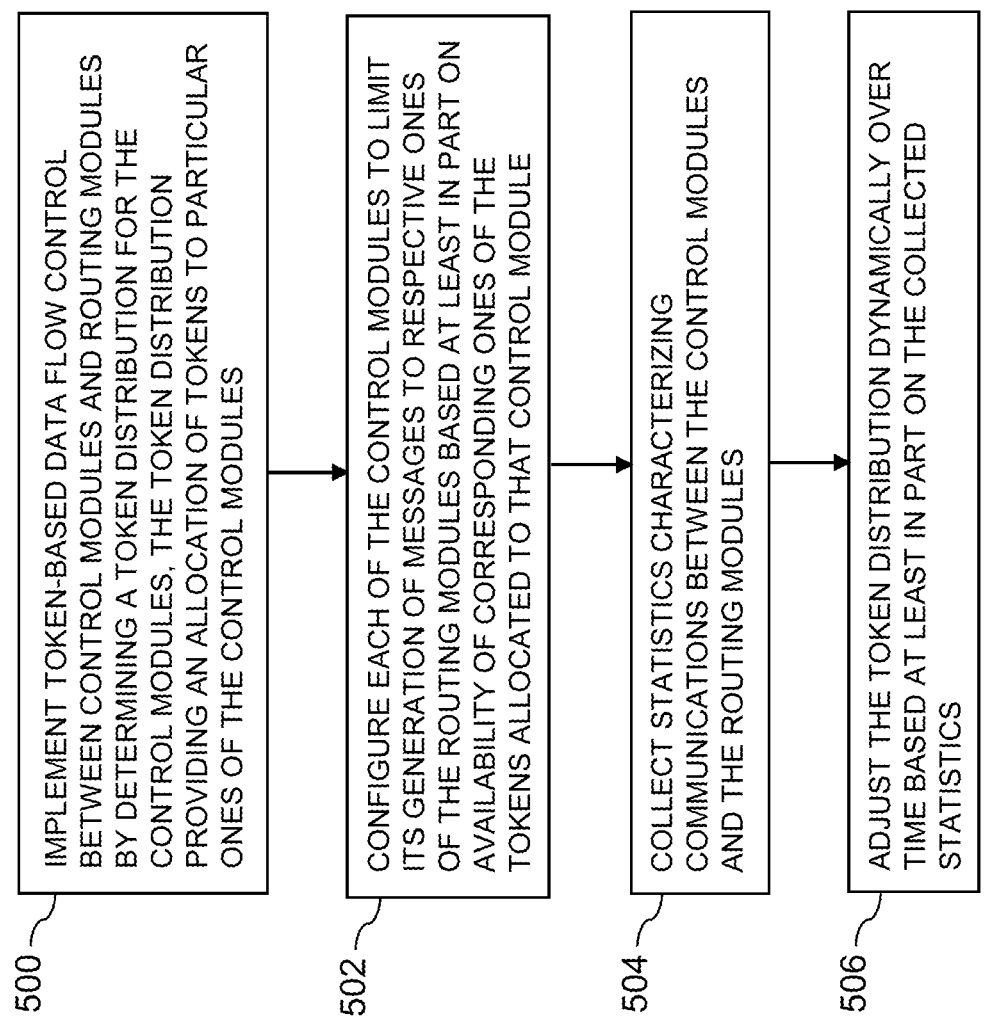
FIG. 5 is a flow diagram of a process for token-based data flow control in a content addressable storage system in an illustrative embodiment.

In the context of the FIG. 1 embodiment, the storage controller 108 of content addressable storage system 105 is illustratively configured to control the performance of steps 500 through 506 of the FIG. 5 process. Other system entities can additionally or alternatively be utilized to control or execute one or more of these steps.

A more particular example of steps 500 through 506 in an illustrative embodiment utilizing an implementation of the FIG. 5 process in a data replication context will now be described. It is assumed for this example that the content addressable storage system comprises an XtremIO™ storage array suitably modified to incorporate token-based data flow control techniques as disclosed herein.

As described previously, in the context of an XtremIO™ storage array, the control modules 108C, data modules 108D, routing modules 108R and management module(s) 108M of the distributed storage controller 108 illustratively comprise C-modules, D-modules, R-modules and SYM module(s), respectively. These exemplary processing modules of the distributed storage controller 108 are configured in the manner described below in order to implement token-based data flow control using the FIG. 5 process.

In the present embodiment, it is assumed that the metadata pages 110, the user data pages 112 and associated network connections are distributed across the multiple processing modules of the distributed storage controller 108. The network connections illustratively include communication links established between the various modules using well-known communication protocols such as Transmission Control Protocol (TCP) and Internet Protocol (IP). For example, sets of IP links used in replication data transfer could be associated with different ones of the routing modules 108R and each such set of IP links could include a different bandwidth configuration.

Ownership of a user data logical address space within the content addressable storage system 105 is illustratively distributed among the control modules 108C. The management module 108M may include a replication engine that engages all of the control modules 108C and routing modules 108R in order to implement a data replication process within the system 100. The data replication process illustratively involves replicating data from one portion of a storage system to another portion of that system, or from one storage system to another storage system. It is desirable in such data replication contexts to control the data flows among the different control modules 108C and routing modules 108R dynamically in order to avoid congestion and to achieve optimum data transfer throughput and latency performance.

This is advantageously achieved through the implementation of token-based data flow control as described below. The token-based flow control avoids problematic situations such as message timeouts that might otherwise occur in the presence of insufficient network connections due to physical constraints or temporary network issues. In addition, it avoids delays that might otherwise occur if data replication tasks are not particularly well balanced across the control modules 108C and routing modules 108R.

In the present embodiment, the token-based data flow control is more particularly configured to dynamically control data flow between the control modules 108C and the routing modules 108R based at least in part on performance objectives in terms of throughput and latency. This illustratively includes dynamic adjustments to take into account temporary system imbalances.

The management module 108M in this embodiment comprises a SYM module of the type previously described. The SYM module allocates each control module 108C a certain number of tokens for each of its available IP links to respective ones of the routing modules 108R. The total number of allocated tokens determines the total number of control-to-routing ("C2R") messages that can be simultaneously supported across all of the control modules 108C, also referred to as "inflight" C2R messages. This is because a control module cannot send a C2R message in the present embodiment unless the control module is first able to obtain a token. The total number of allocated tokens is adjusted periodically or under other conditions based at least in part on statistics characterizing data transfers and other events. The distribution of the total number of allocated tokens over the control modules 108C is also adjusted periodically or under other conditions in a similar manner.

In the data replication context, each inflight C2R message triggers a sequence of message exchanges between replication source and target, and eventually consumes a certain amount of network bandwidth for a certain time period.

An appropriate initial total number of tokens and an initial allocation of those tokens among the control modules 108C can be determined by the management module 108M. This illustratively involves making particular assumptions regarding amounts of data that can be transferred from source to target in a given time window, and amounts of data that can be transferred from source to target for each C2R message. Additional assumptions can be made regarding reasonable message response latency in order to avoid holding certain resources such as threads and message buffers for too long.

The amount of data that can be transferred from source to target in a given time window can be initially estimated by the configured network bandwidth in accordance with the following equation:

$$Data = bandwidth * time.$$

The amount of data that can be transferred from source to target for each C2R message is illustratively determined by factors such as the transfer protocol for the data replication process (e.g., deduplication/compression awareness) and related parameters such as deduplication factor and compression ratio, as well as the distribution of differential data in the data replication process (e.g., number of data transfers per page and number of pages per message). Appropriate initial values for these factors can be based at least in part on heuristic statistics from simulations, laboratory tests or other sources. The amount of data that can be transferred from source to target for each C2R message is then computed using the following equation:

Data per msg=data transfer per page*dedup factor*compression ratio*# of pages per msg.

The number of C2R messages generated from a given one of the control modules 108C is illustratively determined by the ratio of the number of data slices assigned to that control module to the total number of data slices assigned to all of the control modules 108C in the content addressable storage system 105. Assuming a similar distribution of data for each of the data slices, the initial ratio of the number of C2R messages for the given control module ("Cn") to the total number of C2R messages is computed using the following equation:

C2R msg ratio for $Cn$=slices owned by $Cn$/Total # of slices in the system.

The initial number of tokens allocated by the management module 108M to the control module Cn for generating messages to a particular routing module ("Rm") is then given by the following equation:

Token $C2R$=C2R msg ratio for $Cn$*$Rm$ bandwidth*default msg latency/Data per C2R msg.

It is to be appreciated that other techniques can be used to determine an initial number of tokens for each of the control modules 108C in other embodiments.

The management module 108M enforces token-based flow control in this embodiment by computing the entries of the token distribution table 402 based on the system configuration and above-described default assumptions, and then sends the token distribution table 402 or portions thereof to each of the control modules 108C.

In each of the control modules 108C, whenever that module assembles a C2R message, it finds a particular routing module 102R for which it has a token available and then obtains the token before sending out the C2R message to that routing module. The token is once again freed up when a response to the C2R message is received in the sending control module 108C from the routing module 102R. If there is no token available for a particular routing module 108R, the control module 108C would suspend sending C2R messages to that particular routing module until such time as a token for that module becomes available. This avoids adding more workload to the particular routing module.

The management module 108M periodically checks the collected replication data transfer statistics and adjusts the token distribution if appropriate. The statistics in this embodiment include actual data transfer rate for each network connection, C2R message processing rate, and average latency of C2R message processing for each network connection.

If actual latency is lower than desired latency, this is an indication that the content addressable storage system has additional capacity to handle more C2R messages, and the number of allocated tokens for at least one of the control modules 108C is therefore increased.

On the other hand, if actual latency is greater than desired latency, this is an indication of potential congestion between the control modules and routing modules of the content addressable storage system, and the management module 108M therefore decreases the number of allocated tokens for at least one of the control modules 108C.

The distribution of the total number of allocated tokens across the control modules 108C is therefore adjusted responsive to such detected conditions. For example, for a given network connection between control module Cn and routing module Rm, the allocated tokens can be adjusted as follows:

Token $C2R$=C2R msg ratio for $Cn$*($Rm$ data transfer rate/C2R message process rate+(default_latency−actual_latency)*token_inc_factor))

It should be noted that certain system events could significantly change the token distribution. For example, when a communication link to a particular routing module Rm is down, such that routing module Rm has a zero data transfer rate, the number of tokens for that communication link in Rm for each of the control modules should be changed to zero as soon as possible in order to minimize message transfer failures.

As another example, when the distribution of data slices among the control modules 108C changes, the token distribution should also change accordingly, possibly in order to avoid wasting tokens on one or more failed control modules. Such changes in the token distribution can grant more tokens to other control modules so as to allow those modules to take over a larger portion of the data replication tasks.

The token-based data flow control processes of the XtremIO™ storage array example described above can be varied in other embodiments. For example, different types of token distributions and distribution adjustments can be used in other embodiments. Furthermore, although described in the foregoing example in the context of data replication from a source to a target, the token-based data flow control techniques in other embodiments can be implemented in the context of other types of data transfer within a given storage system or from one storage system to another storage system. In addition, the above-described functionality associated with C-module, R-module and SYM module components of the XtremIO™ storage array can be incorporated into other modules or components of a centralized or distributed storage controller in other types of storage systems.

It is also to be appreciated that the FIG. 5 process and other token-based data flow control features and functionality described above can be adapted for use with other types of information systems, including by way of example an information processing system in which one or more compute nodes and a corresponding storage system are all implemented on the same processing platform.

The particular processing operations and other system functionality described in conjunction with the flow diagram of FIG. 5 are therefore presented by way of illustrative example only, and should not be construed as limiting the scope of the disclosure in any way. Alternative embodiments can use other types of processing operations involving token-based data flow control in a storage system. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different types of token-based flow control for respective different portions of a given information processing system.

Functionality such as that described in conjunction with the flow diagram of FIG. 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108 that is configured to control performance of one or more steps of the FIG. 5 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the compute nodes 102 or on storage nodes 115 or 120 of the content addressable storage system 105.

Illustrative embodiments of content addressable storage systems or other types of storage systems with token-based data flow control functionality as disclosed herein can provide a number of significant advantages relative to conventional arrangements.

For example, in some embodiments, the token-based data flow control is configured to limit numbers of control-to-routing messages generated by control modules of respective storage nodes of a clustered storage system to each of a plurality of routing modules of respective ones of the storage nodes based at least in part on availability of tokens to the control modules.

Some embodiments overcome the difficulties that would otherwise be associated with generation of excessive numbers of messages between particular processing modules of a distributed storage controller in a clustered implementation of a content addressable storage system.

These and other embodiments can advantageously provide significantly improved throughput and latency performance in a clustered storage system. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as compute nodes 102 and content addressable storage system 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
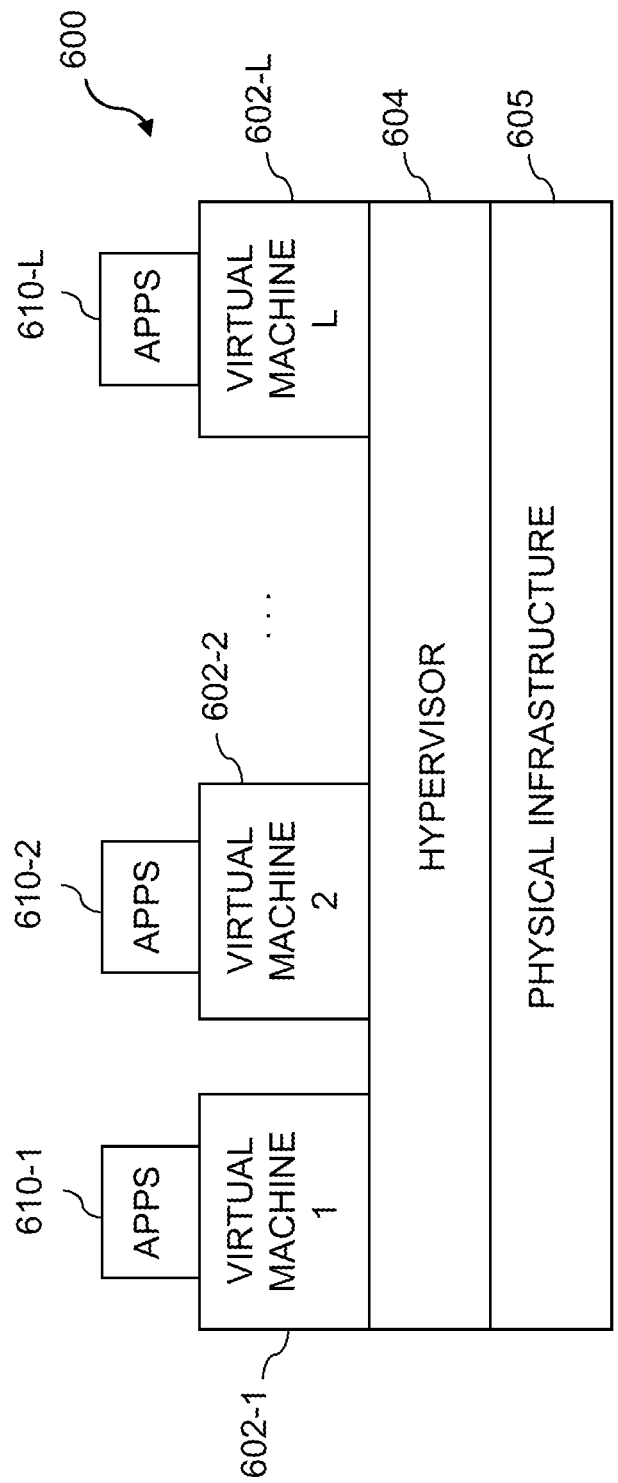
FIGS. 6 and 7 show examples of processing platforms that may be utilized to implement at least a portion of an information processing system in illustrative embodiments.
Figure 7:
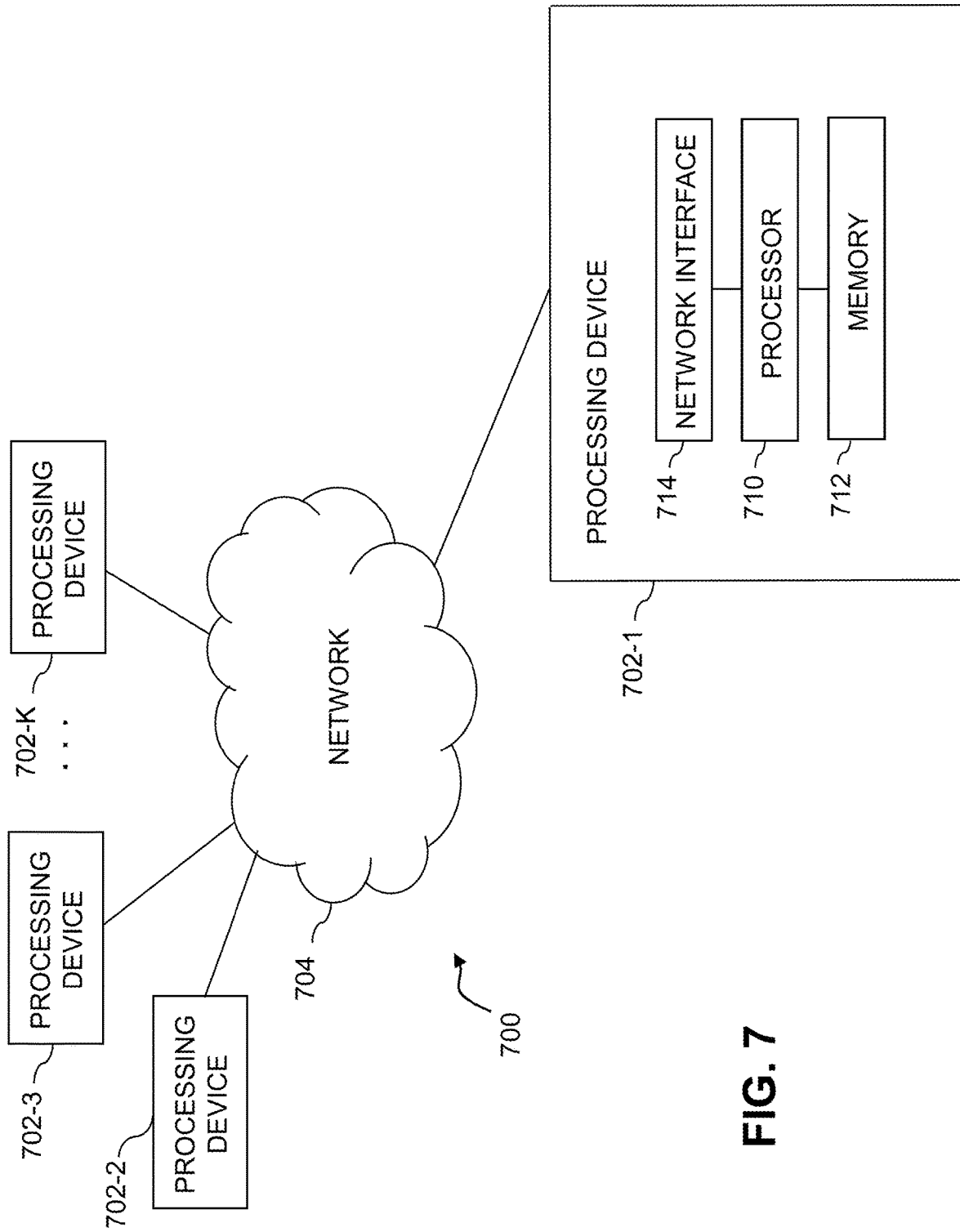

FIG. 6 shows an example processing platform comprising cloud infrastructure 600. The cloud infrastructure 600 comprises a combination of physical and virtual processing resources that may be utilized to implement at least a portion of the information processing system 100. The cloud infrastructure 600 comprises virtual machines (VMs) 602-1, 602-2, . . . 602-L implemented using a hypervisor 604. The hypervisor 604 runs on physical infrastructure 605. The cloud infrastructure 600 further comprises sets of applications 610-1, 610-2, . . . 610-L running on respective ones of the virtual machines 602-1, 602-2, . . . 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 604 and possibly other portions of the information processing system 100 in one or more embodiments is the VMware® vSphere® which may have an associated virtual infrastructure management system such as the VMware® vCenter™. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an application-specific integrated circuit (ASIC), a field-programmable gate array (FPGA) or other type of processing circuitry, as well as portions or combinations of such circuitry elements.

The memory 712 may comprise random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute nodes 102 and the content addressable storage system 105 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, computer systems, compute nodes, storage systems, storage devices, storage controllers, storage nodes and token-based dataflow control processes. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a storage system comprising a plurality of storage nodes each having a plurality of storage devices;
each of the storage nodes further comprising a set of processing modules configured to communicate over one or more networks with corresponding sets of processing modules on other ones of the storage nodes;
the sets of processing modules of the storage nodes collectively comprising at least a portion of a distributed storage controller of the storage system;
wherein the distributed storage controller is configured to implement token-based data flow control between designated ones of the modules by determining a token distribution for the designated modules, the token distribution providing an allocation of tokens to particular ones of the designated modules;
wherein a given one of the modules is configured to limit its generation of messages to other ones of the modules based at least in part on availability of corresponding ones of the tokens allocated to the given module;
wherein the designated modules comprise control modules of respective ones of the storage nodes and wherein the token-based data flow control limits numbers of control-to-routing messages generated by the control modules to each of a plurality of routing modules of respective ones of the storage nodes based at least in part on availability of tokens to the control modules;
wherein the token distribution for the designated modules varies over time as a function of measures relating to data transfer rates, message processing rates and average message latencies of respective corresponding communication links associated with the designated modules; and
wherein each of the storage nodes is implemented using at least one processing device comprising a processor coupled to a memory.

2. The apparatus of claim 1 wherein the distributed storage controller is further configured to collect statistics characterizing communications between the modules and to adjust the token distribution dynamically over time based at least in part on the collected statistics.

3. The apparatus of claim 2 wherein the distributed storage controller is further configured to adjust the token distribution dynamically over time based at least in part on the collected statistics by increasing a number of allocated tokens for at least one of the control modules responsive to an actual latency being less than a desired latency and decreasing a number of allocated tokens for at least one of the control modules responsive to the actual latency being greater than a desired latency.

4. The apparatus of claim 1 wherein the set of processing modules of each of the storage nodes comprises at least a control module, a data module and a routing module.

5. The apparatus of claim 1 wherein the token distribution is implemented at least in part utilizing a token distribution table indicating for each of the control modules a particular number of tokens allocated for use in conjunction with generation of the control-to-routing messages by that control module to each of the routing modules.

6. The apparatus of claim 1 wherein the token distribution specifies a particular number of tokens for each of a plurality of communication links between a given one of the control modules and respective ones of the routing modules.

7. The apparatus of claim 1 wherein a given one of the control modules prior to sending one of the control-to-routing messages to one of the routing modules first determines if a token is available for its communication link to that routing module and if the token is available transmits the control-to-routing message and if the token is not available does not transmit the control-to-routing message.

8. The apparatus of claim 7 wherein after the given one of the control modules transmits the control-to-routing message to the routing module a corresponding one of the allocated tokens becomes unavailable until a response to the control-to-routing message is received from the routing module.

9. The apparatus of claim 1 wherein the distributed storage controller is further configured to determine initial numbers of tokens to be allocated to respective ones of the designated modules based at least in part on ratios of numbers of data slices associated with respective ones of the designated modules to a total number of data slices in the storage system.

10. The apparatus of claim 1 wherein the distributed storage controller is further configured to transmit information characterizing at least portions of the token distribution to control modules in the sets of processing modules of the respective storage nodes.

11. The apparatus of claim 1 wherein the distributed storage controller is further configured to alter the token distribution responsive to a change in a distribution of data slices over the processing modules.

12. The apparatus of claim 1 wherein the token-based data flow control is implemented by at least one system-wide management module of the distributed storage controller.

13. A method comprising:
configuring a storage system to include a plurality of storage nodes each having a plurality of storage devices, each of the storage nodes further comprising a set of processing modules configured to communicate over one or more networks with corresponding sets of processing modules on other ones of the storage nodes; and
implementing token-based data flow control between designated ones of the modules by determining a token distribution for the designated modules, the token distribution providing an allocation of tokens to particular ones of the designated modules;
wherein a given one of the modules is configured to limit its generation of messages to other ones of the modules based at least in part on availability of corresponding ones of the tokens allocated to the given module;
wherein the designated modules comprise control modules of respective ones of the storage nodes and wherein the token-based data flow control limits numbers of control-to-routing messages generated by the control modules to each of a plurality of routing modules of respective ones of the storage nodes based at least in part on availability of tokens to the control modules;
wherein the token distribution for the designated modules varies over time as a function of measures relating to data transfer rates, message processing rates and average message latencies of respective corresponding communication links associated with the designated modules; and
wherein the method is implemented by at least one processing device comprising a processor coupled to a memory.

14. The method of claim 13 further comprising:
collecting statistics characterizing communications between the modules; and adjusting the token distribution dynamically over time based at least in part on the collected statistics.

15. A computer program product comprising a non-transitory processor-readable storage medium having stored therein program code of one or more software programs, wherein the program code when executed by at least one processing device causes said at least one processing device:

to configure a storage system to include a plurality of storage nodes each having a plurality of storage devices, each of the storage nodes further comprising a set of processing modules configured to communicate over one or more networks with corresponding sets of processing modules on other ones of the storage nodes; and to implement token-based data flow control between designated ones of the modules by determining a token distribution for the designated modules, the token distribution providing an allocation of tokens to particular ones of the designated modules;

wherein a given one of the modules is configured to limit its generation of messages to other ones of the modules based at least in part on availability of corresponding ones of the tokens allocated to the given module;

wherein the designated modules comprise control modules of respective ones of the storage nodes and wherein the token-based data flow control limits numbers of control-to-routing messages generated by the control modules to each of a plurality of routing modules of respective ones of the storage nodes based at least in part on availability of tokens to the control modules; and wherein the token distribution for the designated modules varies over time as a function of measures relating to data transfer rates, message processing rates and average message latencies of respective corresponding communication links associated with the designated modules.

16. The computer program product of claim 15 wherein the program code when executed by said at least one processing device further causes said at least one processing device:

to collect statistics characterizing communications between the modules; and to adjust the token distribution dynamically over time based at least in part on the collected statistics.

17. The computer program product of claim 15 wherein the token distribution is implemented at least in part utilizing a token distribution table indicating for each of the control modules a particular number of tokens allocated for use in conjunction with generation of the control-to-routing messages by that control module to each of the routing modules.

18. The computer program product of claim 15 wherein the token distribution specifies a particular number of tokens for each of a plurality of communication links between a given one of the control modules and respective ones of the routing modules.

19. The computer program product of claim 15 wherein a given one of the control modules prior to sending one of the control-to-routing messages to one of the routing modules first determines if a token is available for its communication link to that routing module and if the token is available transmits the control-to-routing message and if the token is not available does not transmit the control-to-routing message.

20. The computer program product of claim 15 wherein the distributed storage controller is further configured to determine initial numbers of tokens to be allocated to respective ones of the designated modules based at least in part on ratios of numbers of data slices associated with respective ones of the designated modules to a total number of data slices in the storage system.

* * * * *